United States Patent [19]

De Nicolo et al.

[11] Patent Number: 5,974,051
[45] Date of Patent: Oct. 26, 1999

[54] SYSTEM INTERPROCESSOR COMMUNICATION USING MEDIA INDEPENDENT INTERFACE-BASED CHANNEL

[75] Inventors: Maurilio Tazio De Nicolo, Saratoga; Stephen S. Ong, Fremont, both of Calif.

[73] Assignee: Cisco Technology, Inc., San Jose, Calif.

[21] Appl. No.: 09/034,790

[22] Filed: Mar. 3, 1998

[51] Int. Cl.[6] .................................................. H04L 12/413
[52] U.S. Cl. ........................... 370/447; 370/438; 710/242
[58] Field of Search .................................... 370/438, 445, 370/446, 447, 448; 375/257; 710/240, 242

[56] References Cited

U.S. PATENT DOCUMENTS

| 4,424,565 | 1/1984 | Larson ..................................... 364/200 |
| 4,750,136 | 6/1988 | Arpin et al. .............................. 364/514 |
| 5,268,592 | 12/1993 | Bellamy et al. ........................... 307/43 |
| 5,311,172 | 5/1994 | Sadamori .............................. 340/825.5 |
| 5,359,320 | 10/1994 | Jaffe et al. ........................... 340/825.5 |
| 5,369,639 | 11/1994 | Kamerman et al. .................... 370/85.3 |
| 5,408,469 | 4/1995 | Opher et al. ............................ 370/60.1 |
| 5,444,847 | 8/1995 | Iitsuka ..................................... 395/287 |
| 5,479,395 | 12/1995 | Goodman et al. ......................... 370/16 |
| 5,491,804 | 2/1996 | Heath et al. .............................. 395/275 |
| 5,561,669 | 10/1996 | Lenney et al. ........................... 370/60.1 |
| 5,632,021 | 5/1997 | Jennings et al. ........................ 395/309 |
| 5,673,265 | 9/1997 | Gupta et al. .............................. 370/432 |
| 5,729,546 | 3/1998 | Gupta et al. .............................. 370/434 |
| 5,732,079 | 3/1998 | Castrigno ................................. 370/362 |
| 5,737,364 | 4/1998 | Cohen et al. ............................. 375/220 |
| 5,740,174 | 4/1998 | Somer ...................................... 370/402 |
| 5,742,604 | 4/1998 | Edsall et al. ............................. 370/401 |
| 5,751,710 | 5/1998 | Crowther et al. ....................... 370/423 |
| 5,787,070 | 7/1998 | Gupta et al. .............................. 370/217 |
| 5,793,987 | 8/1998 | Quackenbush et al. ................ 395/280 |
| 5,796,732 | 8/1998 | Mazzola et al. ........................ 370/362 |
| 5,819,051 | 10/1998 | Murray et al. ........................... 395/287 |

*Primary Examiner*—Hassan Kizou
*Assistant Examiner*—Clement Towsend
*Attorney, Agent, or Firm*—D'Alessandro & Ritchie

[57] ABSTRACT

A media independent interface (MII) is utilized on each processor card of a multi-processor card system in a carrier sense multiple access/collision detection (CSMA/CD) standard bus configuration to provide a data communications bus. This permits standard Media Access Control (MAC) devices to be used with the MII. The collision domain is implemented by having each active processor card using the data communications bus assert an analog signal on a single conductor of the back plane and sense its voltage value to determine if one or more processor cards are currently accessing the bus.

13 Claims, 2 Drawing Sheets

| NUMBER OF TRANSMITTERS | VOLTAGE | COLLISION? |
|---|---|---|
| 0 | $V_{CC}$ | N |
| 1 | $a \cdot V_{CC}$ | N |
| 2 | $b \cdot V_{CC}$ | Y |
| 3 | $c \cdot V_{CC}$ | Y |
| $\geq 4$ | $\leq d \cdot V_{CC}$ | Y |

$a > b > c > d$

SYSTEM INTERPROCESSOR COMMUNICATION USING MEDIA INDEPENDENT INTERFACE-BASED CHANNEL

BACKGROUND OF THE INVENTION

1. Field of the Invention

The present invention is directed to a method and apparatus which permit each processor card of a modular multi-processor card system to communicate with other processor cards including a supervisor module processor card.

2. The Background Art

Modular multi-processor systems are known in the art. Such systems typically include a back plane having a number of receptacles to which processor cards can be attached. It is often necessary or desirable to establish communications among the various processor cards for various reasons. In the past, such communications were sometimes implemented over parallel bus type architectures using large numbers of conductors to pass communications among the processor cards. Such systems, while fit for their intended purposes, have the drawback that they utilize more conductors than necessary to carry out the needed communications. They also require custom drivers and protocols which adversely impact development time, cost, design architecture, debugging and troubleshooting. Such systems are often complex and utilize valuable resources such as the conductors. Other systems have implemented such communications using several separate serial channels based upon RS232 UART devices. This approach resulted in fewer conductors used in the backplane, but the drawback was that the communications speed was limited by the serial performance of the UARTs. It should also be noted that almost all prior implementations of such interprocessor communications systems required centralized arbitration which means that a master had to be present in the system. Failure of a master causes whole communications channels to be shut down.

Accordingly, it would be desirable to provide an improved method and apparatus for carrying out interprocessor communications while utilizing fewer conductors, higher bandwidth and standard drivers and protocols, thus reducing costs, development time and effort and/or freeing up additional conductor paths for other purposes.

SUMMARY OF THE INVENTION

A media independent interface (MII) is utilized on each processor card of a multi-processor card system in a carrier sense multiple access/collision detection (CSMA/CD) standard bus configuration to provide a data communications bus. This permits standard Media Access Control (MAC) devices to be used with the MII. The collision domain is implemented by having each active processor card using the data communications bus assert an analog signal on a single conductor of the back plane and sense its voltage value to determine if one or more processor cards are currently accessing the bus.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
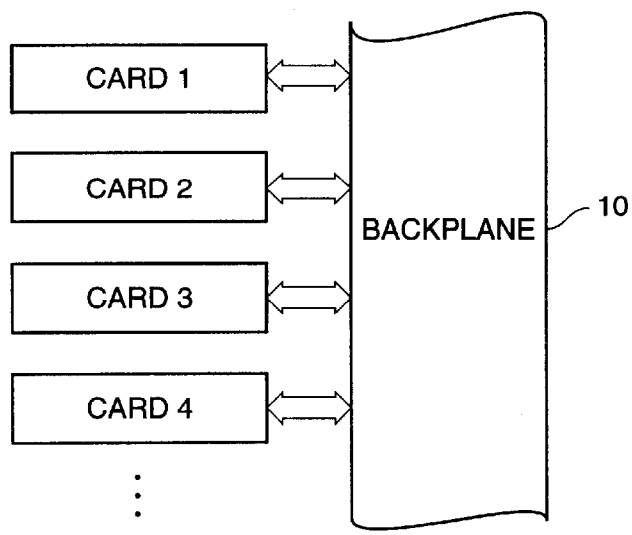
FIG. 1 is a block diagram showing a multi-processor system in accordance with a presently preferred embodiment of the present invention wherein a plurality of processors communicate with a back plane communications system.

The present invention is directed primarily towards a multi-processor system using a back plane to which each of the processors or processor cards attaches. Here, a processor means and refers to a card performing a function and having a capability of communicating over a data communications bus. As shown in FIG. 1, a number of processor cards denoted Card 1, Card 2, Card 3, and Card 4, are connected to a back plane 10. In accordance with the presently preferred embodiment of the present invention, as shown is in FIG. 2, the back plane 10 includes a data communication bus 12 which may preferably be four bits wide, a data valid line 14 which may be one bit wide and which may be used to signal the presence of valid data on data communication bus 12, and an analog collision detection line 16 which preferably comprises a single conductor as shown.

While many existing systems provide for collision detection on a data bus, usually in a digital context, the present invention offers many advantages in a multi-processor environment. For example, in accordance with a presently preferred embodiment of the present invention, a commonly available MAC/MII device such as a QQ80C300 available from SEEQ Technology, Inc. of Fremont, Calif., or an AM79C971 available from AMD of Sunnyvale, Calif., may be used to carry out communications with each processor card. Because each and all of the processors in a particular system may be housed in a single chassis, a single clock signal may be used to control all processors and data on the back plane data communications bus. The ability to use a single clock signal to control all processors arises because of the short conductor lengths possible by building all of the processors into the same chassis.

Another advantage of this approach is the ability to use standard drivers and protocols, such as TCP/IP, which are widely available and well known. This will yield more robust systems which have shorter development cycles and lower costs. Debugging, troubleshooting and monitoring will similarly be easier to implement.

In accordance with a presently preferred embodiment of the present invention, system interprocessor communications using a 100 megabit per second channel are supported by implementing a data communications bus out of four circuits, each operating at a 25 MHz speed, in accordance with the IEEE 802.3 communications standard as well known to those of ordinary skill in the art. The use of a single timing source obviates the need for additional devices defined in the IEEE 802.3 communications standard which would otherwise be required to synchronize timing signals among the various data circuits and processors.

Turning back to FIG. 2, it can be seen that a relatively simple system which is far less complex than that defined for CSMA/CD under IEEE 802.3 can be provided to allow the various processors connected to the back plane 10 to know when data bus 12 is being used by another processor connected to back plane 10.

Figure 2:
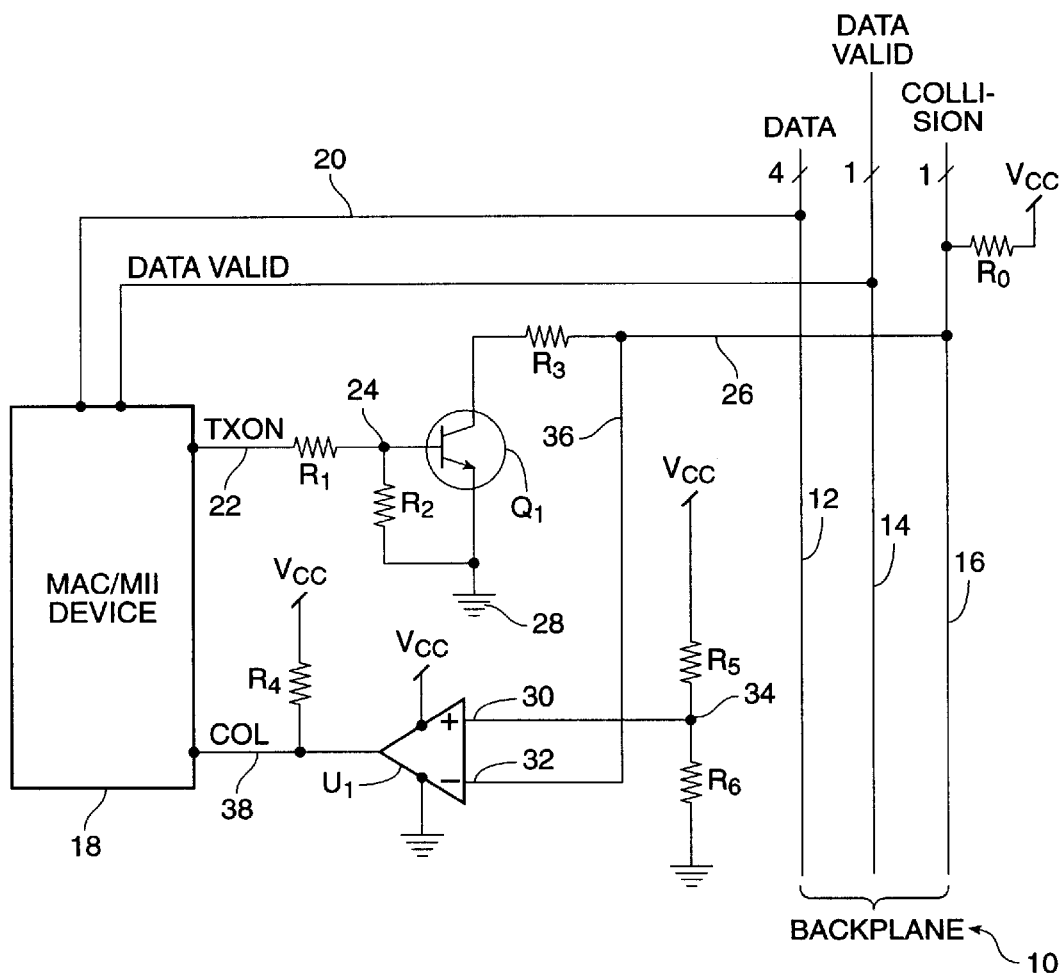
FIG. 2 is a schematic diagram showing a presently preferred implementation of the present invention for setting and detecting collision conditions on a analog collision detection line of the back plane.

In accordance with the present invention, collision detection line 16 is biased to a first voltage (here: $V_{CC}$) through a first resistor R0. In a presently preferred embodiment of the present invention, $V_{CC}$ is 3.3 volts and R0 is 50 Ohms. A first MAC/MII device 18 is connected to the back plane 10 as shown in FIG. 2. When the MAC/MII device 18 is actively transmitting data onto data communications bus 12 of back plane 10 over line 20, it asserts a signal TXON, or "transmit" on line 22 ("transmit enable line") to indicate that transmission is enabled and being carried on at the given moment. The signal may be a positive voltage and passes through resistor R1 to node 24 whereupon it turns on transistor Q1 directing current from collision detection line 16 over line 26 through resistor R3 through transistor Q1 to a second voltage level 28 here represented as ground. In accordance with the presently preferred embodiment of the present invention, resistor R3 is a 100 Ohm resistor, and resistors R1 and R2 are 1,000 Ohm resistors. Transistor Q1 may be a 2N4401#NPN silicon MOS transistor.

Figures 3, 4:
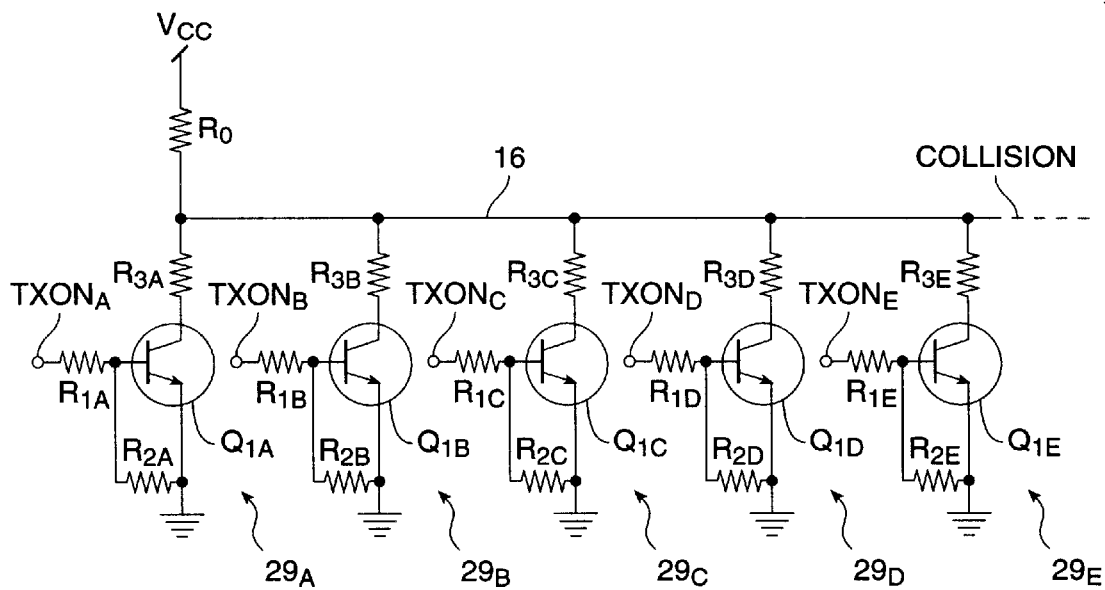
FIG. 3 is an electrical schematic diagram showing the effective circuit of the analog collision detection system in accordance with a presently preferred embodiment of the present invention.
FIG. 4 is a table showing how the number of transmitters transmitting onto a data communications bus in accordance with a presently preferred embodiment of the present invention affects the voltage on the analog collision detection line, and determines whether or not a collision state exists.

Turning to FIG. 3, the effect of multiple TXON signals on collision detection line 16 can readily be seen. In FIG. 3, five (or more) transmit enable circuits 29A, 29B, 29C, 29D and 29E are shown connected to analog collision detection line 16. As each successive TXON signal (here denoted $TXON_A$, $TXON_B$, $TXON_C$, $TXON_D$ and $TXON_E$) is asserted, transistors $Q1_A$, $Q1_B$, $Q1_C$, $Q1_D$, and $Q1_E$ turn on in due course connecting resistors $R3_A$, $R3_B$, $R3_C$, $R3_D$, and $R3_E$ in parallel, and collectively in series with resistor R0.

The result of this succession of additional resistors being turned on is to asymptotically reduce the voltage on collision detection line 16 with each successive resistor. This can be seen in FIG. 4 which is a table describing operation of the system depending upon the number of transmitters, voltage on analog collision detection line 16 ("collision potential") and collision state.

Now, returning to FIG. 2, in order for MAC/MII device 18 to know when not to transmit, it must sense the voltage level ("collision potential") of analog collision detection line 16 in some fashion. In a presently preferred embodiment of the present invention, comparator U1, which may preferably be a National Semiconductor LM393 voltage comparator, has a non-inverting input 30 and an inverting input 32. Non-inverting input 30 is connected to a fixed voltage source, or third voltage which is preferably set by voltage divider network 34 comprising resistor R5 and resistor R6. In accordance with the presently preferred embodiment of the invention, the third voltage is intermediate, the first voltage ($V_{CC}$) and the second voltage (ground) and for a 3.3 Volt $V_{CC}$, may preferably be above 1.96 volts. In accordance with a presently preferred embodiment of the present invention, resistor R5 has a value of 2,050 ohms and resistor R6 has a value of 3,010 Ohms. The inverting input to comparator U1 is connected via line 36 to line 26 and to line 16 which is the analog collision detection line 16. Comparator U1 compares the third voltage provided by voltage divider 34 with the voltage on analog collision detection line 16. Line 38 is connected to the output of comparator U1 and to first voltage ($V_{CC}$) through pull-up resistor R4, which may preferably be a 1,000 Ohm resistor. Line 38 is thus input to MAC/MII device 18 at input "COL" whereupon if the signal is low, MAC/MII device 18 is free to transmit on data communications bus 12, and if the input COL is high, MAC/MII device 18 is not free to transmit on data bus 12. In this way, if 0 or 1 transmitters have asserted TXON, no collision condition is present as shown in FIG. 4. If 2 or more transmitters have asserted TXON, then a collision condition exists.

Those of ordinary skill in the art will readily realize that the values of resistors and specific identity of components and voltage levels are given by way of example only and many other combinations would work as well.

In operation, in a 3.3 volt VCC system, if no MAC/MII is device 18 is utilizing data bus 12, then analog collision detection line 16 will have a voltage of 3.3 volts which will be greater than 1.96 volts and will cause comparator U1 to permit any of the MAC/MII devices to transmit. If a single MAC/MII device 18 is using the data bus, then the voltage on collision detection line 16 will be 2.2 volts which will permit that MAC/MII device to continue transmitting data, but would preferably preclude a second MAC/MII device from attempting to use the data communications bus 12, thus implementing a bus disabling function which disables use of the bus by the given processor while the collision potential is in a range of voltage values indicative of a collision. Were a second MAC/MII device to attempt to use the bus, the assertion by the second device of its corresponding TXON signal would result in a collision data detection line 16 voltage value of 1.65 volts which would be below the 1.96 volt threshold set by voltage divider 34. Accordingly, a collision condition would then exist, each corresponding MAC/MII device would detect the collision and would be forced to disregard the data received during the collision condition in accordance with the IEEE 802.3 protocols. Were a third device to simultaneously assert TXON, the voltage on collision detection line 16 would be 1.31 volts. If a fourth were to assert its respective TXON, then the voltage on collision detection line 16 would be 1.1 volts.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A multi-processor system including a data communications bus for providing data communications to the processors of said multi-processor system, said system comprising:

an analog collision detection line biased to a first voltage through a first resistance;

a second resistance associated with each processor, each said second resistance coupled between said analog collision detection line and a switch, said switch coupling said second resistance to a second voltage while engaged;

a transmit signal generated by each processor while the processor is transmitting onto the data communications bus, each said transmit signal coupled to and controlling the state of a corresponding said switch so as to engage said switch while the processor is using the data communications bus; and a comparator associated with each processor, said comparator comparing a collision potential of said analog collision detection line with a third voltage and asserting a collision detection signal to said processor if said collision potential is less than said third voltage.

2. A system according to claim 1 further comprising:

a data communications bus disabler associated with each said processor for disabling use of the data communications bus by said processor while said collision detection signal is asserted to said processor.

3. A system according to claim 2 wherein said first resistance is less than said second resistance.

4. A system according to claim 3 wherein said first voltage is greater than said second voltage.

5. A system according to claim 4 wherein each said switch includes a transistor.

6. A system according to claim 5 wherein said third voltage is intermediate said first voltage and said second voltage.

7. In a multi-processor system including a plurality of processor cards, each of which is connected to a back plane communications system including a data communications bus, the improvement comprising:

an analog collision detection line biased to a first voltage through a first resistor;

each of the processor cards having a first connection to said analog collision detection line through a second resistor, each of said second resistors having substantially the same value, a first end of the second resistor operatively coupled to said analog collision detection line and a second end of said second resistor operatively coupled to a switch, each said switch coupled to and controlled by a transmit enable line of the processor card so that while engaged by said transmit enable line said switch couples said second end of said second resistor to a second voltage;

a comparator associated with each of the processor cards, said comparator comparing a collision potential of said analog collision detection line with a third voltage and asserting a collision detection signal if said collision potential is in a predetermined range.

8. A system according to claim 7 further comprising means for disabling use of the data communications bus by a particular processor card while said particular processor's comparator is asserting a collision detection signal.

9. A system according to claim 8 wherein said first resistor has a resistance less than a resistance of said second resistor.

10. A system according to claim 9 wherein said first voltage is greater than said second voltage.

11. A system according to claim 10 wherein each said switch includes a transistor.

12. A system according to claim 11 wherein said third voltage is intermediate said first voltage and said second voltage.

13. A method of detecting a collision condition on a data communications bus providing data communications among a plurality of processors, said method comprising the steps of:

providing a connection to an analog collision detection line to each of the processors;

providing a first voltage bias to said analog collision detection line through a first resistance;

causing a second resistance to be connected between said analog collision detection line and a second fixed voltage potential for each of the processors using the data communications bus at a given time;

comparing a potential of said analog collision detection line with a third fixed voltage potential at each of the processors;

determining, at each of the processors, if more than one of the processors is using the data communications bus at said given time; and asserting a collision condition at each of the processors if and while said determining step determines that more than one of the processors is using the data communications bus at said given time.

* * * * *

UNITED STATES PATENT AND TRADEMARK OFFICE
CERTIFICATE OF CORRECTION

PATENT NO: 5,974,051
DATED: October 26, 1999
INVENTOR(S): Maurilio Tazio De Nicolo, Stephen S. Ong It is certified that error appears in the above-identified patent and that said Letter Patent are hereby corrected as shown below:

In Col. 2, line 29, delete "is" after as shown.

In Col. 4, line 14, delete "is" after no MAC/MII.

Signed and Sealed this

Seventeenth Day of April, 2001

*Attest:*

NICHOLAS P. GODICI

*Attesting Officer*    *Acting Director of the United States Patent and Trademark Office*